United States Patent [19]

Searby

[11] Patent Number: 4,485,402
[45] Date of Patent: Nov. 27, 1984

[54] VIDEO IMAGE PROCESSING SYSTEM

[75] Inventor: Anthony D. Searby, Newbury, England

[73] Assignee: Micro Consultants Limited, Berkshire, England

[21] Appl. No.: 311,821

[22] Filed: Oct. 16, 1981

[30] Foreign Application Priority Data

Oct. 17, 1981 [GB] United Kingdom ............... 8033536

[51] Int. Cl.³ ............................................. H04N 5/91
[52] U.S. Cl. .................................. 358/160; 358/134; 358/136
[58] Field of Search ................... 358/22, 105, 111, 13, 358/149, 93, 134, 136, 160, 167, 166, 183, 21 R, 146, 138; 340/799; 364/515

[56] References Cited

U.S. PATENT DOCUMENTS 3,919,716 11/1975 Yumde et al. ...................... 358/134
4,092,728 5/1978 Baltzer ............................... 364/900
4,148,070 4/1979 Taylor ................................ 358/160

FOREIGN PATENT DOCUMENTS 106116 8/1979 Japan .................................. 358/183

Primary Examiner—Tommy P. Chin
Attorney, Agent, or Firm—Dowell & Dowell

[57] ABSTRACT

A video processing system including a number of frame stores with common highways. A number of input ports together with a computer have access to the input highway via buffers and the output ports together with the computer have access to the output highway via buffers. Each port together with the computer is allocated sequential time slots of short duration by a time slot control. Thus to an operator it will seem that he has continuous access to the system. Image planes greater than normal frame size can be handled by the address control. Additional data paths and processing hardware may be provided to enhance the system capabilities.

36 Claims, 16 Drawing Figures

|   |   | SELECTED IMAGE PLANE NUMBER | | | |
|---|---|---|---|---|---|
|   |   | 1 | 2 | 3 | 3(FINISH) |
| A | FRAME NUMBER OFFSET | 1 | 21 | 37 |   |
| B | FRAME QUANTITY X LENGTH | 5 | 4 | 3 |   |
| C | FRAME QUANTITY Y LENGTH | 4 | 4 | 2 |   |
| D | X OFFSET | 620 | 700 | 850 |   |
| E | Y OFFSET | 800 | 300 | 750 |   |
| F | X DISPLAY COUNT | 0 | 0 | 0 | 511 |
| G | Y DISPLAY COUNT | 0 | 0 | 0 | 511 |
| H | WHOLE FRAME X OFFSET | 1 | 1 | 1 | 2 |
| I | WHOLE FRAME Y OFFSET | 1 | 0 | 1 | 2 |
| J | X ADDRESS | 108 | 188 | 338 | 337 |
| K | Y ADDRESS | 288 | 300 | 238 | 237 |
| L | FRAME NUMBER | 7 | 22 | 41 | 45 |
| M | X LIMIT CHECK (B>H≥0) | YES | YES | YES | YES |
| N | Y LIMIT CHECK (C>I≥0) | YES | YES | YES | NO |
| P | BLANKING | NO | NO | NO | YES |

*Fig. 7.*

VIDEO IMAGE PROCESSING SYSTEM

BACKGROUND OF THE INVENTION

The invention relates to the manipulation of picture data by digital techniques.

It is known from British Pat. No. 1,568,378 (U.S. Pat. No. 4,148,070) to provide an arrangement for manipulating picture data by storing the data in a frame store and giving random access to this stored video data during the video blanking time to process this data with an algorithm. FIG. 1 shows such an arrangement.

In the video processing system of FIG. 1, a composite video signal is received at input 9 and applied to video input port 12 which separates the sync pulses present on the incoming video. The incoming video is converted from analogue to an 8 bit digital word within input port 12 and the digitized output 13 is applied to a frame store and control 15. The detected sync pulses on the incoming signal are used within port 12 to provide timing information for clocking the analogue to digital converter and timing information is also provided at output 14 for the frame store and control 15. External syncs (genlock) may be provided at input 11 to provide the necessary timing information if required.

The digitized video samples (picture points) are stored in a large number of memory locations within the frame store and the addresses of these locations are accessed by the store control in time relation to the timing information from the output of video input port 14.

The digital video held in the frame store is read continuously to the input 18 of a video output port 19 which converts the digitized video data to analogue form and adds sync pulses from an internal generator to provide a composite video signal at output 20.

The sync pulses generated also provide timing control for addressing the store locations to read out the stored data. External syncs (read genlock) may be applied to port 19 if required. The composite video can be displayed on a conventional T.V. monitor 22.

The basic conversion, storage and reconversion of the video signals can be modified by means of a computer 24 and computer address and control unit 25. The output 27 of control unit 25 is received by input port 12. Control unit 25 under computer control can adjust the number of bits in a word to be used (i.e. up to 8 bits) and also decide whether the entire frame is stored. The computer 24 has access via control 25 control data line 27 to the store 15. Computer address information from control 25 is received by input 26 of the store.

The computer therefore is capable of addressing any part of the store, can read out the data and modify the data and re-insert it via video input port 12.

The computer control data line 27 is also connected to output port 19 which control can select for example the field to be displayed and the number of bits to be used. Any required computer peripheral 23 can be attached to the I/O buses of the computer 24.

Instead of using the computer to modify the data a video processor 28 is provided which contains processing hardware. The processor 28 receives the digitized video from port 12 at input 16 and the digitized video from the store at input 17. After processing, the data from output 29 can be applied to the video input port 12.

The above system is concerned therefore with storing video data in a digital form in a frame store which data is basically Raster in format. This data may be processed under software control or completely new data may be added. Instructions for the addition and processing of data come from the system computer via control 25. The asynchronous nature of the system allows operation over a very wide range of frame rates from standard T.V. through slow scan systems such as electron microscopes to line scan cameras. Non-raster type formats such as spiral and polar scans could be entered via the computer interface. The operation of the above system requires timing information which is extracted from the sync information (write genlock), contained in the composite video input. The video information is digitized by converting each picture point to an 8 bit word to give 256 possible levels (e.g. 256 shades of grey). The digitized data is written into locations, specified by an address, within the frame store. The timing information extracted from the sync information is used to define the address. This timing information gives positional information (start of line, end of field etc) to enable each picture point to be written into the frame store in its correct position.

The frame store used in this known arrangement may be of the type disclosed in British Pat. No. 1,568,379 (U.S. Pat. No. 4,183,058) which comprises sector cards each made up of N channel dynamic MOS R.A.M. integrated circuits. The store structure is related to that of the T.V. raster and may be considered as two cubes. Each cube holds one of the two fields that make up a frame. Each field consists of 256 lines, each line containing 512 picture points. Each picture point is stored as an 8 bit word so the store has 8 bit planes. Alternate lines of the frame are stored in alternate fields. The two halves of the frame store may be used independently to store two separate frames, the resolution of which will be half the normal. Depending upon the resolution required each field may also store separate pictures (up to 8 separate 1 bit resolution pictures). The frame store can accept video at 10 MHz (15 MHz max) sampling frequency and reproduce it for display at the same rate.

The reading process from the store to the display is uninterrupted by any computer demands. For the purpose of reading from or writing into the store the access time of the memory is 67 nSec therefore enabling a standard T.V. picture to be easily accommodated from the 512 samples in a line. The computer can only gain access to the frame store during the line blanking period. The computer has random access and specifies its address in an array form. The selected array may be of any size from single point to the whole store. The array selected may also be in any position within the store. Thus by merely identifying the top left hand corner of the rectangle and the length of the two sides any address area is accessible. Computer data is fed in at a slow rate (typical cycling frequency of the computer is from 500 KHz depending upon whether an array is being addressed or individual picture points) and is buffered to be fed into the frame store at the transfer rate of the system, typically 10 MHz. Thus data is speeded up for writing out into the store and slowed down to read it back to the computer.

The above system could be expanded as explained in the aforementioned patent to provide full RGB colour by the addition of two more frame stores. Such colour pictures could be either entered into the system on a frame sequential basis or alternatively three input video ports could be provided.

OBJECT OF THE INVENTION

The present invention is concerned with a modified processing system capable of providing greater processing power and flexibility than heretofor. The invention is also concerned with a processing system which can modify data at times other than during the blanking interval.

SUMMARY OF THE INVENTION

According to the invention there is provided a video image processing system comprising at least one of a data input port and a data output port; a plurality of frame stores each capable of storing data equivalent to a frame of video information; a common input highway for the frame stores and adapted to receive data for storage in the frame stores; a common output highway for the frame stores and adapted to provide data from the frame stores; processing means adapted to have access to at least one of the common input and output highways respectively to effect processing of the data available therefrom; and control means for controlling the passage of the data to and from the common highways to allow the processing means and the at least one of the data input and output port to independently gain access to the frame stores for a given period on a time multiplex basis.

BRIEF DESCRIPTION OF DRAWINGS

The invention will now be described by way of example with reference to the accompanying drawings, in which:

FIG. 7 shows the various calculations achieved by the FIG. 5 arrangement;

DESCRIPTION OF PREFERRED EMBODIMENT

Figure 1:
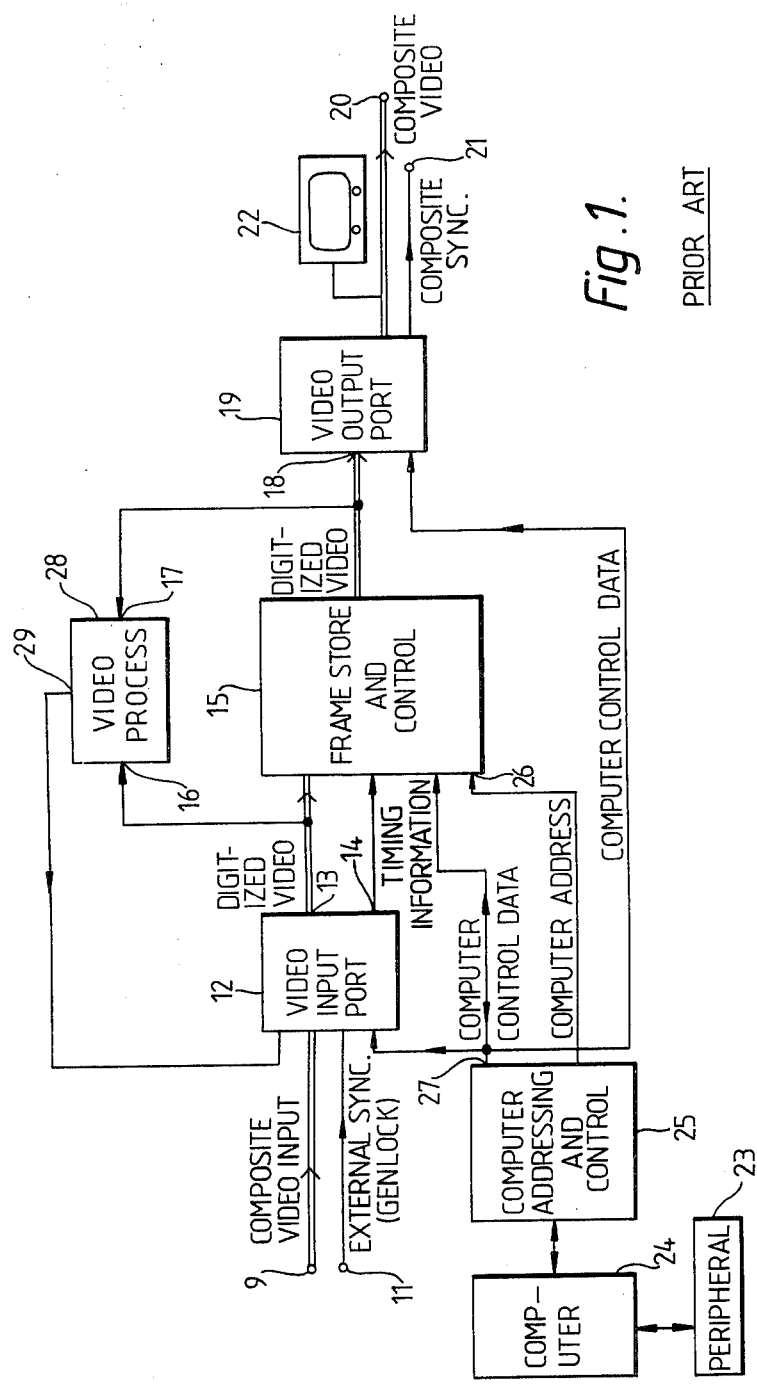
FIG. 1 shows the known video processing system disclosed in U.S. Pat. No. 4,148,070.
Figure 2:
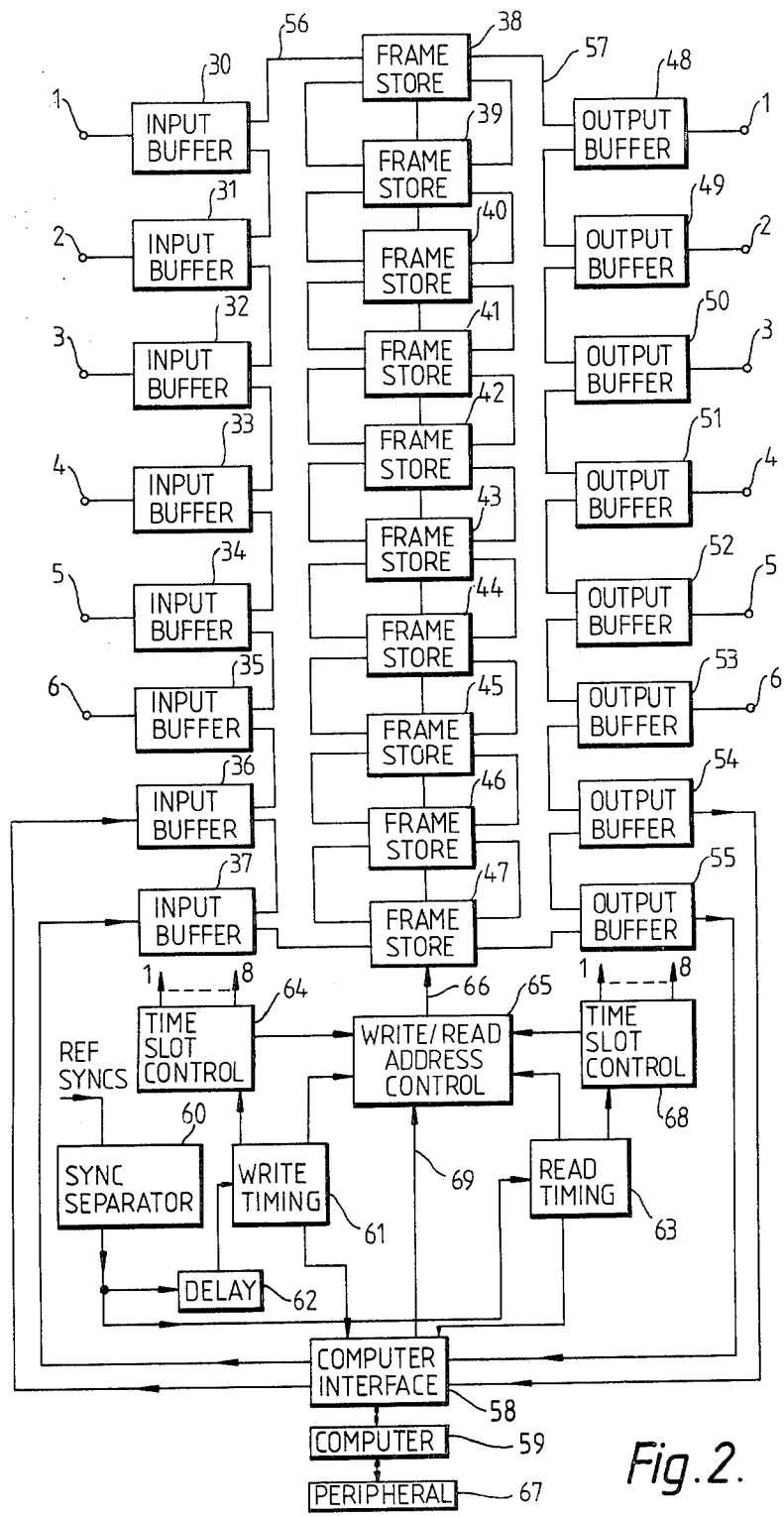
FIG. 2 shows one embodiment of the system of the present invention.

The FIG. 2 arrangement shows one configuration for realising the invention using a common highway arrangement.

The incoming video is received from separate input ports 1, 2, 3, 4, 5 and 6 by respective input buffers 30–35. The incoming video can come from any suitable picture sources such as six cameras, synchronised with each other, using Genlock techniques for example. The incoming video information to each port is received by the buffers as 8 bit digital data (having been converted from analogue to digital form as necessary). The buffers operate as input multiplexers by assembling the video data (already in 8 bit digital form) into blocks of 8 picture points (pixels) so as to be in a 64 bit format and passing this data onto the video data highway 56 on a time sharing basis.

Figure 3:
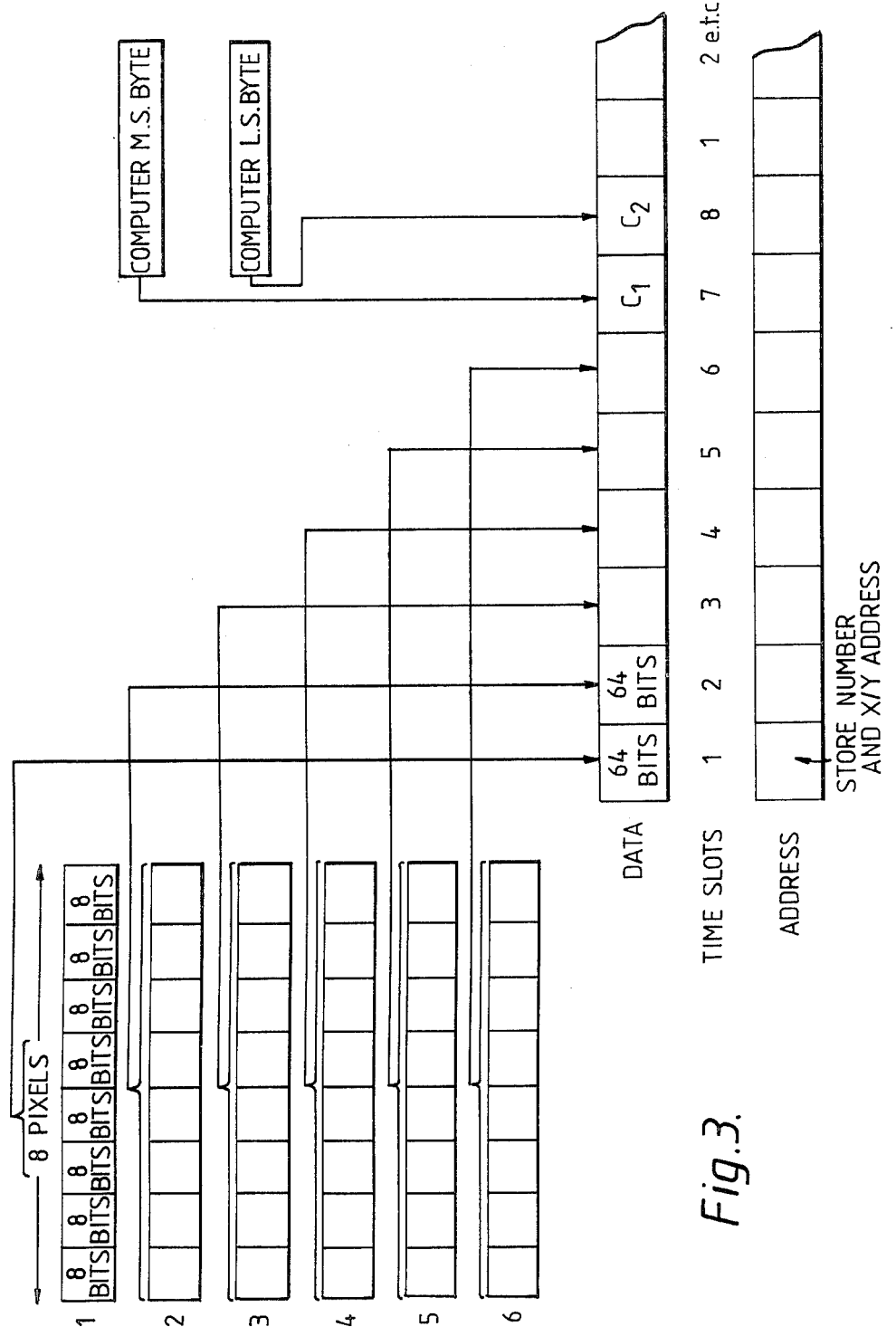
FIG. 3 shows the time slot arrangement associated with the FIG. 2 system.

The time sharing capability is provided by allocating time slots to the buffers so that each has sequential access to the highway 56 for a period (data wise) corresponding to 8 picture points in length in this system. In addition to the input buffers 30–35, further buffers 36 and 37 are provided for use by computer 59 via computer interface 58 so that this also has rapid and frequent access to the input highway 56, each buffer 36 and 37 allowing the computer data to be input onto the highway in every period equivalent to 8 picture points. In practice although buffers 36 and 37 have the capability of dealing with blocks of data of 64 bits, due to the relatively slow data handling capabilities of the computer the information actually passed to input buffers 36 or 37 will be of 1 byte. Thus a single picture point of up to 16 bit definition can be dealt with for example in this joint period. The allocation of the time slots is illustrated in FIG. 3. The video data from ports 1 to 6 respectively is allocated time slots 1 to 6 and the computer has the slots 7 and 8 (i.e. for most significant byte C1 and least significant byte C2). The time slot allocation then repeats. Because the 8 picture points pass as a single block of data onto the input highway, although a time slot is equivalent to 8 picture points (data wise) the actual time allocation need only be the equivalent of one picture point so that all the 8 buffers are sequentially given access to the highway in the period equivalent to 8 picture points, although this could be varied if desired. The time slots are determined by time slot control 64. A plurality of frame stores in the example 10, are also connected to common input highway 56. Each frame store would typically have sufficient storage for 512×512 picture points (pixels) each of 8 bit resolution. Data on this highway can be stored in any of the frame stores 38–47, the store address control 65 allocating a particular store and an address (i.e. the X and Y address) within the store via address highway 66 for a given time slot as illustrated in FIG. 3. In practice, each of the 8 picture points entering a given frame store is allocated to one of 8 store sectors within that frame store to allow the data to be at a rate compatible with frame store handling capabilities as described in U.S. Pat. Nos. 4,148,070 and 4,183,058. The writing in of data into the system is determined by timing block 61 which produces picture point clocks for time slot and address controls 64 and 65. The timing is synchronised to incoming data by means of the reference information received by sync separator 60. These syncs can be provided directly from the picture source as Genlock signals, or derived from the sync information available from the incoming composite video in normal manner.

Although 10 frame stores are shown for simplicity they can be expanded as required and can be accommodated on the common highway 56. Because the highway is common to all inputs there need not be a specific relationship between the number of inputs and the number of stores. Up to 256 frame stores could be accommodated with the arrangement shown.

The data held in the frame stores 38–47 is available for read out for a given time slot onto the common output highway 57 under the influence of the read address given from control 65 via highway 66 shared by the stores. The output buffers 48–55 have access to this data dependent on their allotted time slot determined by control 68. Thus the first time slot is allocated to buffer 48 to hold data on 8 picture points and reformat the data. In other words this buffer operates in the reverse manner to the input buffer. The data from the buffer 48 is provided at output port 1 for display (reconverted into analogue form as required) or for external manipulation. Similar operation takes place for ports 2 to 6 via the remaining buffers. Output buffers 54 and 55 are provided to allow the computer to gain access to stored information via the output highway. These buffers can be given access to stored information originally supplied either from the input ports 1–6 or previously entered from the computer 59 via interface 58 along the common input highway 56. The data fed into the system via computer 59 may have been received by an external peripheral 67, such as a magnetic tape device with slow scan video data thereon. As the data captured by the output buffers 54 and 55 may comprise the blocks of 64 bit data these may be sequentially read out to the computer via interface 58, so as to pass on all of the 64 bit data in that block.

The system of FIG. 2 operates in a synchronous manner, the read and write timing blocks 63 and 61 receiving timing information from separator 60. Delay 62 is provided to introduce a fixed differential in the frame timing between read and write, this being typically equivalent to a period of several picture points, for reasons discussed in more detail below.

The computer interface 58 has timing information supplied to it from blocks 61 and 63 respectively so that it knows when to pass data to the buffers 36 and 37 and when to expect data from output buffers 54 and 55, the interface 58 itself providing a buffering function. Such computer interfacing is well known, see U.S. Pat. No. 4,148,070 referred to above for example.

The system shown in FIG. 2 thus allows access on a time sharing basis from a number of sources connected to ports 1 to 6 to allow real time storage in store locations allocated by control 65 and passage of stored data to the output ports. In addition manipulation of video derived data by the computer is also possible, which data may have been entered via the ports 1 to 6 or via the computer. The output ports may also gain access to stored data previously entered or manipulated by the computer so as to allow display of this information. Because of the time slot allocation, a number of independent operations can be produced effectively simultaneously and the data handled in these time slots can be from the same or different pictures.

Such an arrangement allows great flexibility to be achieved as data need not be pre-assigned to any particular store because of the common highways but typically can be assigned by the computer 59 under program control via input line 69. The data need not be accessed by the computer for processing only during the blanking interval, as was the operating arrangement in U.S. Pat. No. 4,148,070, referred to above, because of the time slot allocation. A specific application would be to use input ports 1 to 3 to handle the Red, Green and Blue data from a colour video source. The Red data for example could be passed to more than one of the stores as desired. Further, the system allows the possibility of expanding the data bit-wise so that 512×512 pixels each of 16 bits can be used in place of 8 bit resolution by sharing between two stores each handling 8 of the 16 bits. By using 6 stores it would be possible to handle 3×16 bit RGB pictures.

Rather than increasing the number of bits/pixel it is possible to expand the number of picture elements within the normal frame. Thus using 4 of the frame stores it would be possible to include 1024×1024 (instead of 512×512) and then choose the desired area within that stored for display. The computer itself can have access to the entire 1024×1024 locations even if all these are not used for the actual display.

The maximum output frequency for display is 15 MHz which equals 768 pixels/line of 64 μs for PAL or NTSC T.V. This allows 585×768 picture points to be displayed rather than 512×512 normally expected (if the normal picture point and line counters were replaced with counters of 768 and 585 bits capacity as desired). If a lower frame rate can be accommodated (such as slow scan T.V. with a display having phosphor persistance) then it could display the entire 1024 picture points without exceeding the 15 MHz rate.

Figure 4:
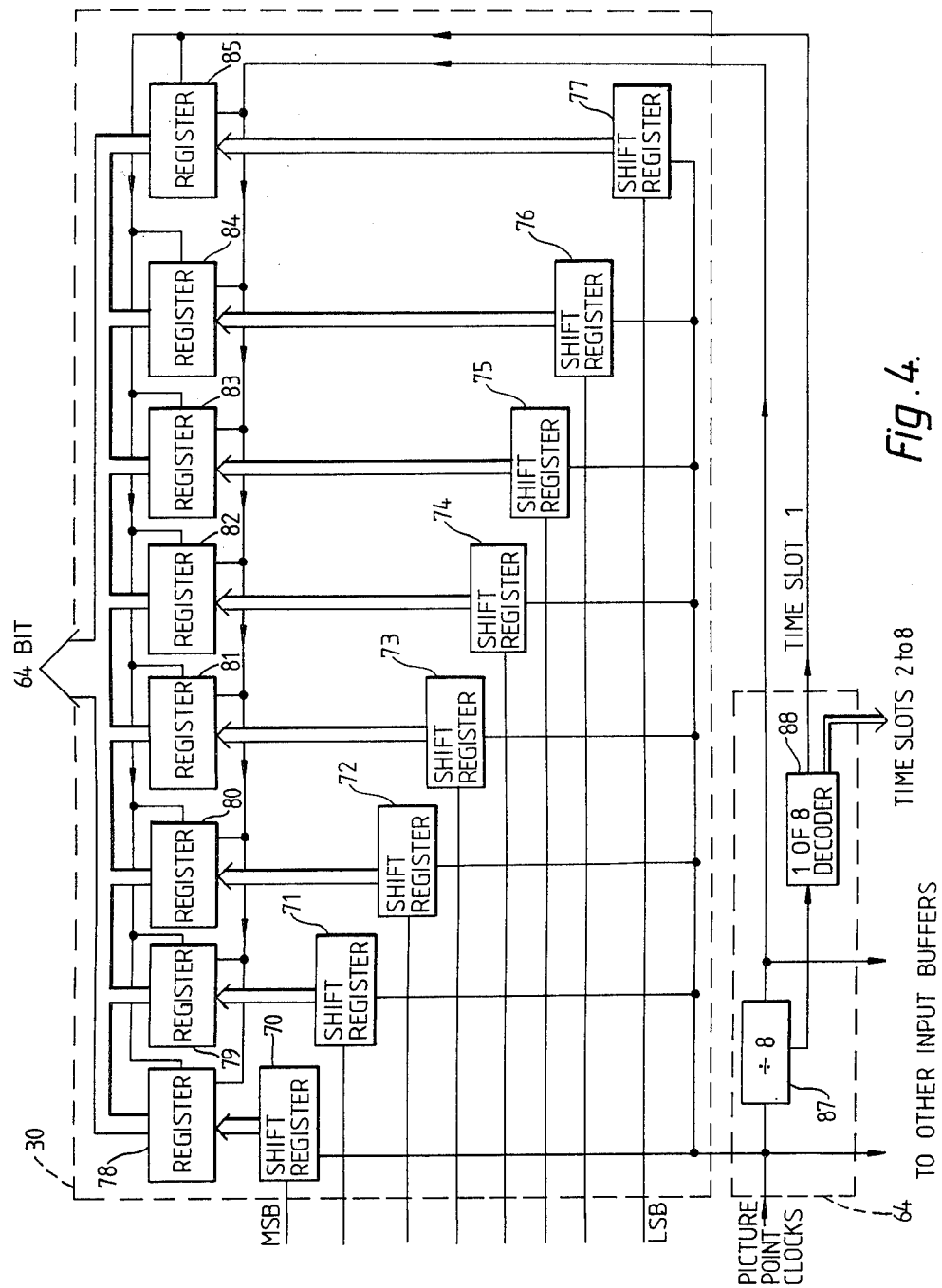
FIG. 4 shows an input buffer with the time slot control in greater detail.

The construction of the input buffers will now be described in more detail with reference to FIG. 4, which shows one of the input buffers 30 together with the time slot control 64. The buffer includes 8 shift registers 70–77 and 8 registers 78–85. The shift registers each receive 1 bit of the 8 bit data for an incoming pixel, register 70 receiving the most significant through to register 77 receiving the least significant bit. Each shift register is itself of 8 bit storage capability. Thus 1 bit of 8 consecutive picture points is stored in each shift register under the control of the picture point clocks which are provided in standard manner from the write timing block 61 of FIG. 2. After the receipt of 8 picture points a pulse is provided from the divide by 8 device 87 within control 64. This pulse clocks the data held in the respective shift registers into the respective 8 bit registers 78–85. Further incoming picture points then pass to the shift registers as before. The data in the registers 78–85 constitutes the 64 bit block illustrated in FIG. 3. Each time slot is provided by decoding the binary output of device 87 into 1 of 8 lines so that the generation of time slot 1 therefrom causes a tri-state output enable to allow the data within registers 78 to 85 to be available to the common input highway 56 of FIG. 2. Dependent on operational requirements, the registers 78 to 85 may have more than one 8 bit storage location so that one location can be available to receive data from the shift registers whilst another already holding data can be available for exit to the input highway.

The picture point clocks, the output from divider 87 and one of the respective outputs from decoder 88 are made available to the other buffers 31–37 of FIG. 2. The output buffers 48–55 and the time slot control 68 are of similar construction, although the operation is reversed in that data passes to the registers as a block of 64 bits which is then entered into the shift registers and shifted out picture point by picture point under picture point clock control. The input and output buffers which are dedicated to computer use can be simplified if desired by omitting the shift registers so that input data for example from the computer is passed directly to one of the registers equivalent to 78 to 85 by using a 1 of 8 decoder driven directly by the three least significant bits of the computer address. In such a configuration interface 58 would also provide a signal to indicate which 1 framestore sector of 8 should be "write enabled". Similar comments apply to data passing from the output highway 57 to the computer.

IMAGE PLANES

As already explained, the system of the above form could be constructed to incorporate up to 256 frame stores sharing the common highway using appropriate time slots and addressing.

By producing a system incorporating common highways and frame stores it is possible by manipulating the addressing provided by control 65 to provide additional facilities for varying the storage allocations of data and the portions of that data retrieved for further processing or display. Areas which make up a given picture of interest will be referred to as image planes. It is possible to define the image plane to be used as now described to allow areas within specific pictures to be looked at dependent on manipulations carried out within address control 65.

Figure 5:
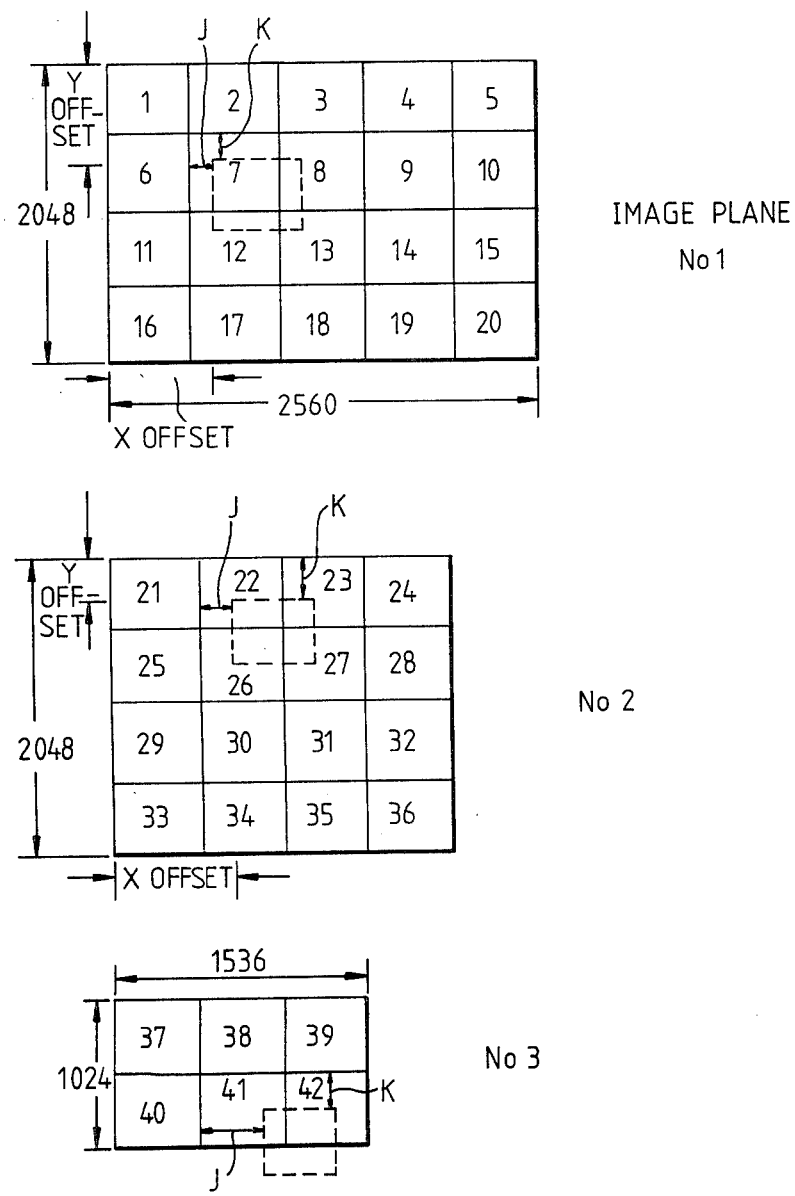
FIG. 5 shows examples of possible image plane configurations.

FIG. 5 shows three examples of image planes selected from a possible 256 frame area which could be handled by increasing the number of frame stores from 10 to 256. These additional frame stores would simply be added to share the input and output highways 56 and 57 and the write/read address output 66 from control 65. Even with the 10 stores shown image planes of a size up to 10 frames can be constructed. A plane could be equivalent to all ten frames down to single frame size.

Figure 6:
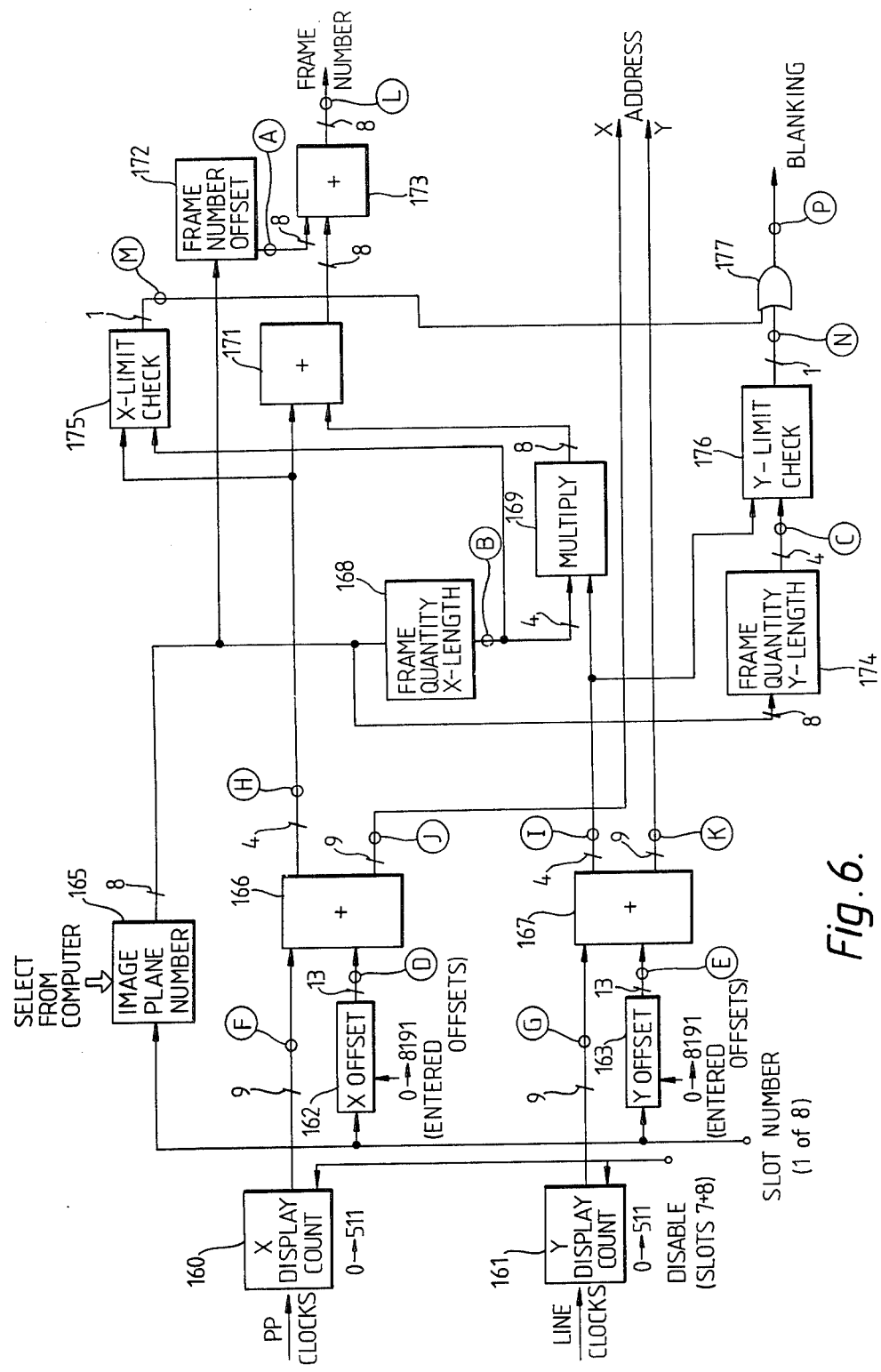
FIG. 6 shows a mechanism for calculating the relevant frame address for a particular location with the image plane.

A large selection of predefined image planes could be stored within address control 65 for example each identified by a number which on entering the identification number would cause the system to select that image plane with the predetermined dimensions. In this example the first image plane comprises a group of 20 stored frames (frames 1 through 20) of the possible 256. In image plane no. 2, the image plane comprises 16 stored frames (frames 21 through 36). In image plane no. 3, 6 stored frames are present (frames 37 through 42). Although the three examples have image planes constituted by data from dissimilar frames, this is not necessary and another image plane could be constructed from say frames 19–22. As already explained, because of the eight time slots, a different selected image can be processed during these respective time slots. The actual frame area accessed for a write or read operation from within the available image plane is shown by the broken lines and in practice would typically be under joystick control. Movement of the joystick will give rise to an X offset and a Y offset as shown. Thus, considering a read operation, for image plane 1 with the frame area accessed being as shown in the example, then because of the common output highway, data can be retrieved from frame stores 7, 8, 12 and 13 without problem and the frame so constructed will look like a normal frame (i.e. although the frame is constituted from information from several frame stores, it will not be degraded where information from one frame store ceases and another commences. Thus the boundries between frames 7, 8, 12 and 13 need not be present in the displayed image. For the system to operate automatically it is necessary to include a mechanism (e.g. within address control 65) capable of determining from the selected joystick window position the relevant frames and more specifically the desired picture points within the frames to be accessed to construct the desired frame. A way in which the correct addressing can be computed is shown in FIG. 6, which now constitutes the address control 65 of FIG. 2. Its operation will be considered during a read time slot during which it receives read clocks from read timing block 63. The arrangement would operate in a similar manner in a write operation in which case clocks are received from timing block 61.

The display address counting (512 picture points, although this could be expanded if desired for reasons described above) is provided by X and Y counters 160 and 161 respectively. These counters respectively receive the normal picture point and line clocks from the read timing block 63. To allow for possible scrolling an X and Y offset selector 162, 163 respectively is also provided to generate the desired offset dependent on joystick position for that particular time slot. Thus these selectors may comprise RAMs with offset values derived from joystick positions stored therein and one of which is output in dependence on the time slot number (1 of 8). The maximum offsets for a 256 frame store system (16×16) would be 8192 pixels. Thus returning to the FIG. 5 example the X offset position has been selected to be equivalent to 620 pixels for image plane no. 1 chosen for the first time slot say. The Y offset selected is equivalent to 800 pixels for the joystick position shown in the first image plane. The X and Y counters 160 and 161 are incremented picture point by picture point such that the resultant address for X and Y respectively is provided by adders 166 and 167 which takes into account the actual count plus the offset. In this example the X and Y address are 108 and 288 respectively and are identified by J and K in the image plane no. 1 of FIG. 5. Thus this address for X and Y is made available to the address highway 66 for that time slot. In addition the frame number is required for which that particular address is to be used and its computation is now explained, with reference to FIG. 6 and FIG. 7.

As already mentioned, the operator can define a list of image plane configurations, examples of which are shown in FIG. 5 and he can choose to use a particular image plane for a given time slot which plane is identified by its image plane number. The number of the image plane selected for each time slot is entered into plane store 165, which number could simply be selected using standard digital thumbwheel switches for example or conveniently using the computer keyboard. The identity of each image plane for each of the time slots will be output in turn under the control of block 68 of FIG. 2. This data made available from the image plane number store 165, which, dependent on the image plane selected, will be used to access frame data from X length store 168, Y length store 174 and offset store 172, each comprising a look up table. These look up tables may constitute a preprogrammed ROM or a RAM loaded with image plane data via computer 59. Frame quantity X length memory 168 holds data on each X length for the respective image planes available in the system and in dependence on the identity data received will output the desired length (identified as output B in the list in FIG. 7 and also in FIG. 6). For image plane No. 1 it equals 5 frame stores. Similarly the Y length memory 174 provides the number of frames for that particular image plane. Thus for image plane no. 1 this equals 4 frames (see output C in FIGS. 6 and 7).

In practice the outputs A to C of FIG. 7 are fixed for a given image plane, with the offsets (D and E) being dependent on the joystick position or some other means for generating the relative quantity used to access the selectors 162 and 163. The computation for the X and Y address (see J and K) will be made for each picture point following increments of the counters but in the table of FIG. 7, only the address start for image plane no. 1 is shown with counters 160 and 161 being zero (see F and G). Similarly with image planes no. 2 and 3 the start is shown, but for plane no. 3 the end of the frame calculation is also shown to illustrate the blanking aspect described later. Returning to image plane no. 1, the desired frame number is identified using adders 171 and 173 and multiplier 169. The adder 166 produces two outputs. The output H produces the quantity of whole frames resulting from the summation whilst output J is the 'remainder' of picture points from this sum. In this example the number of whole frames is 1 and the remainder is 108 pixels which defines the X address as already explained. A similar situation occurs for the Y adder 167 giving a resulting 1 for I and 288 for K.

This former output from adder 167 is received by multiplier 169 which multiplies this number with the output from store 168 and the result is used in adder 171 to which the whole frame X quantity (H) is added before receipt by further adder 173.

In adder 173 the frame number offset (A) read out from memory 172 is added to the output from adder 171. This addition step gives the frame store number (L) for which the address is to be associated (in this case frame store number 7 as shown in FIG. 5). This computation is effected for each time slot and the address is incremented accordingly.

Whilst the above blocks are all that are needed to calculate the desired locations, where the joystick or equivalent control is allowed to move partially outside the image plane then additional elements are used to provide blanking as necessary (see Y length memory 174, X limit block 175, Y limit block 176 and OR gate 177 with outputs C, M, N and P respectively). The output (C) of frame quantity Y length memory 174 is used for comparison with the frame quantity output (I) of adder 167 to detect in checker 176 whether this former value remains larger than I and greater or equal to zero using standard logic techniques.

Similarly the output B of frame quantity X length memory 168 is compared with the H output of adder 166 to determine in checker 175 whether the value of B remains greater than H and greater or equal to zero.

As shown in the last column of FIG. 7, the computation of frame 45 (see L) is achieved, but due to the presence of OR gate 177, the output P provides blanking during this interval. (It is clear from the illustration in FIG. 5 that blanking will also occur during frame 44 resulting from calculations on the pertinent pixels within the desired frame.).

Thus having chosen the desired image plane, the relevant data is accessed from the frame stores and made available on the common output highway 57 for receipt by the relevent output buffer 48 through 55. Similar comments apply to the write operation using highway 56. The FIG. 6 arrangement would then use clocks from write timing block 61 and time slots from control 64. Such an arrangement is still flexible enough when required to allow single frames to be dealt with. For example, by defining image plane numbers 50 to 57 (say) to relate to single image stores 1 to 10 (i.e. stores 38 to 47 of FIG. 2) then by choosing image plane number 50 for the first time slot for example then input buffer 30 would have access to store 38 alone if no offset is introduced via generators 162 and 163. For computer time slots 7 and 8 the display counters 160 and 161 are expediently disabled as shown so that the X and Y offsets themselves pass without modification through adders 166 and 167 so that these offsets defined by the computer in known manner effectively form the particular location to be accessed and in this manner the computer accesses the frame stores via the image plane mapping control 65.

As each time slot is independent, up to 6 operators (using the embodiment of FIG. 2) could be accommodated. Not only do they have the ability to share the frame storage facilities but they can use the same data as well if required. If colour operation is required then two operators could use 3 ports each on a RGB basis.

Figure 8:
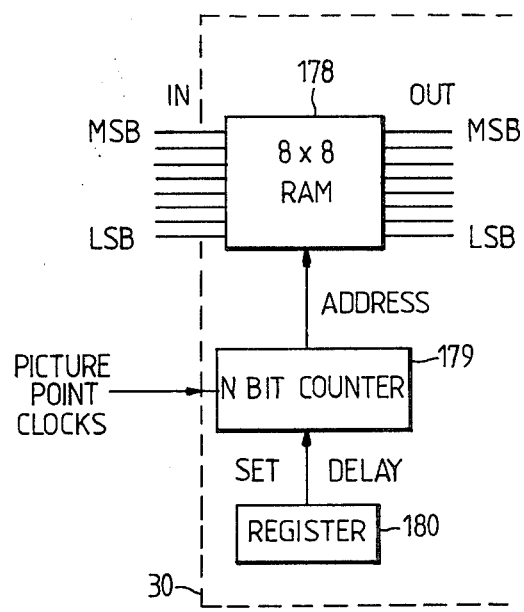
FIG. 8 shows the construction of a variable digital delay.

The system described with relation to FIG. 6 has the capability of choosing the window under joystick control to an accuracy of a single picture point. In practice because the data being passed to and from the stores is in blocks of 64 bits, this limits the window in the X direction to the accuracy of the block (i.e. 8 picture points). Where there is a requirement to achieve offset control to a single picture point, then it is necessary to provide a variable delay dependent on the offset required in order to cause the correct initial picture point to be the first in a given block of 8. A device capable of providing this operation is shown in FIG. 8. This device comprising 8×8 bit RAM 178, N bit counter 179 and register 180 forms a digital delay which would be provided in each of the input buffers and output buffers for example. Thus considering the buffer 30 of FIG. 4 the RAM 178 would be connected between input port 1 and shift registers 70–77 so that 8 bit incoming video data passes to the buffer shift register via the RAM. The RAM will have 8 possible address locations each for storing one 8 bit word for a given picture point. The address is defined by the output of N bit counter 179 which output depends on the picture point clocks received. In the case where N=8 then considering eight Read/Write operations, in the first operation no data is available for read out but the first picture point is written into the first RAM location during the write portion of the cycle. This process continues under clock control until all the 8 locations have data on 1 picture point and then the counter 179 resets and the RAM is addressed at its first location once again. This time location 1 provides the first picture point for read out and receives the 9th incoming picture point for storage during this Read/Write operation and this process continues until all picture points 9-16 are sequentially stored, points 1 to 8 having been sequentially read out. Thus it can be seen that the RAM provides a delay period equivalent to 8 picture points. Varying the value of N causes the delay to be varied. When N=3, the counter only counts 3 incoming picture point clocks before resetting so that the delay period before the addressing returns to a given location is reduced from 8 to 3 picture point clocks. Thus the first picture point goes in location 1, the second and third into their respective locations, but then the counter resets and the first picture point is read out and the first location now receives the fourth picture point and so on. Choosing a value of N defines the delay required and for a given time slot this value effectively controls the offset for that buffer. The value of N for the given time slot associated with that buffer may be stored in register 180. In practice it is convenient to make use of the output of X offset block 162 to define the value of N for a given time slot. The 3 least significant bits of the offset provided by block 62 corresponds directly to the value of N up to 8 and the separate register 180 can be omitted if desired.

A similar process operates for the output buffers and would be provided between the shift registers (within the buffer) and the output port for example.

Figure 9:
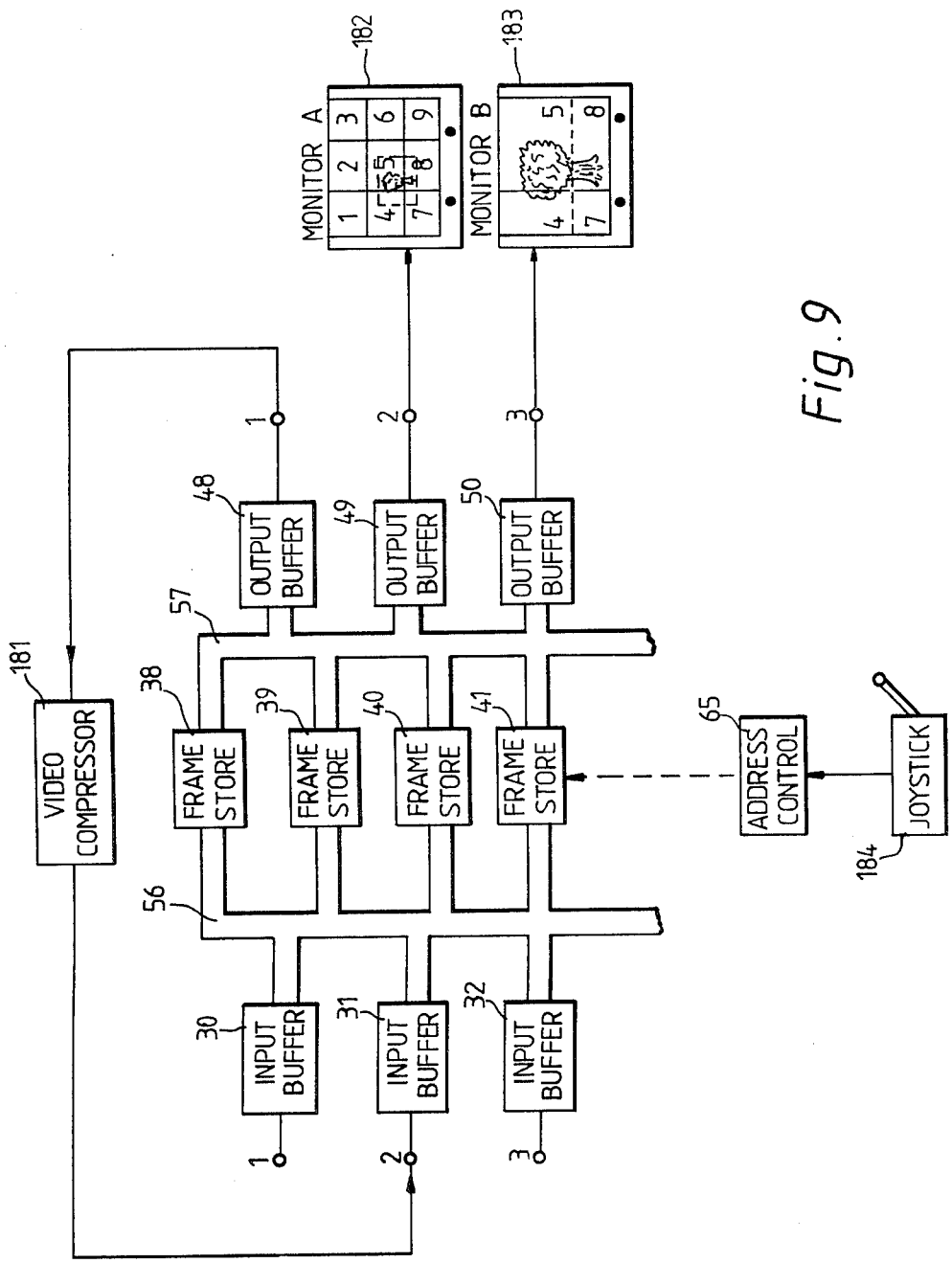
FIG. 9 shows additional facilities for monitoring an entire image plane.

The powerful and flexible handling capabilities of the FIG. 2 arrangement using time slots and common highways will now be illustrated by way of example with reference to the FIG. 9 configuration which shows a digital video compressor 181 connected between the output port 1 and the input port 2. A first monitor 182 is connected to output port 2 and a second monitor 183 is connected to output port 3. The address control 65 is influenced by the joystick 184 as described above. Although a joystick has been used this may be substituted by an equivalent manually controlled device e.g. tracker-ball or touch tablet. Only part of the highways and part the total number of frame stores are included for simplicity. Assuming that the system stores hold data previously entered say via computer 59 which relates to slow scan video information and encompasses an area equivalent to a number of frames. Choosing a given image plane illustrated as constituting frames 1 to 9, then this entire image plane can be systematically accessed and passed via the output buffer 48 and the first output port to the compressor 181 during the first output time slots.

The compressor 181 is effectively a zoom down device which electronically reduces the size of the image plane which in this example is shown as 3×3 frames. Such techniques of size reduction are already known from U.S. Pat. No. 4,163,249 and in this instance it will require a fixed degree of compression for a particular selected image plane. Larger image planes (see image plane no. 1 of FIG. 5) will have to receive a greater degree of compression than smaller image planes. The required degree can be selected from a look up table in the same way as the elements within the FIG. 6 arrangement responding to the output of block 165 dependent on the selected image plane number. The resultant frame reduced from the 9 frame matrix as it is generated is passed into an empty frame store via input port 2 during the second input time slots.

The stored compressed image can be monitored by gaining access to this during the second output time slots and passing this via buffer 49 and the second output port to the monitor 82.

On viewing the compressed image of that image plane on monitor A, this is seen to contain a tree. By moving the joystick so as to encompass this portion of the image plane of interest it is possible to monitor this tree at full size using the monitor 183. This is possible because the output buffer 50 for the third time slots can be given access to the same data available in the first time slots, as data from the frame stores is not destructively read out and remains in store unless written over. Although the frame is constructed from data from parts of frames 4, 5, 7 and 8 from different stores the resultant image is not degraded due to the common highway configuration.

Although the inputs from the buffers are shown as being directly received by the monitors, in practice these will typically pass via digital to analogue converters and via processor amplifiers where the necessary synchronising signals will be added. Normally the frame numbers within the image plane and the boundaries on monitor A as the system makes these transparent to the operator need not be displayed. In practice the frame numbers and the frame boundaries on monitor B would typically not be shown, but purely an image transparent to any frame edges would be shown. As the joystick is moved the image on monitor B will pan or tilt whilst that on monitor A will be fixed. If the border defining the selected window is provided this will change in sympathy with the image on monitor B under joystick control. Such a border can be generated using standard curser generator techniques. Where an operator is dealing with colour information, additional ports can be brought into play to assemble the desired image.

ADDITIONAL CAPABILITIES

Figure 10:
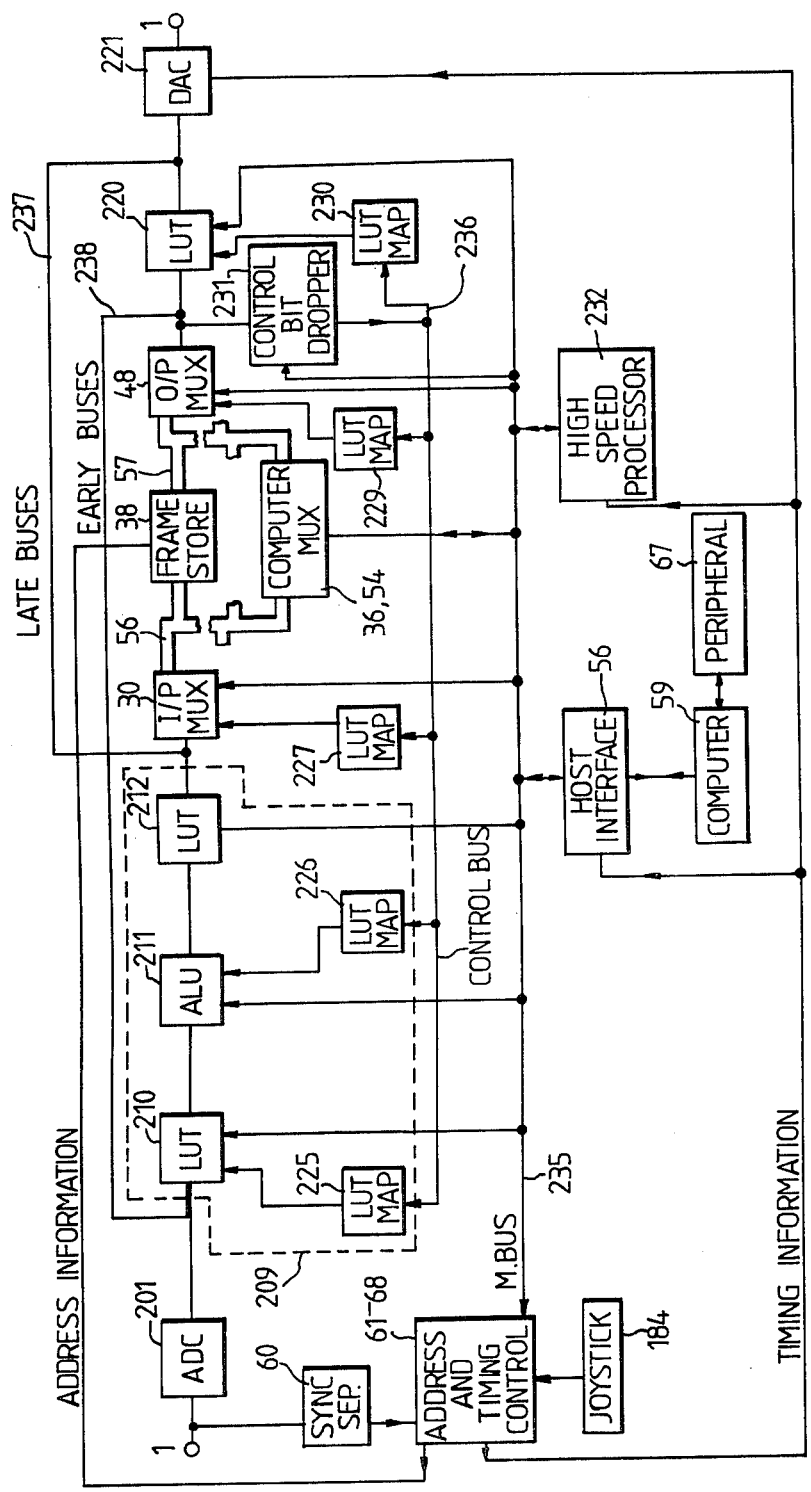
FIG. 10 shows the FIG. 2 arrangement expanded to include additional processing capabilities.

Although the processing provided by compressor 181 is shown routed actually from an output port and back to an input port of the system this and other processing can be accommodated within the system itself when the FIG. 2 arrangement is suitably modified. To illustrate this FIG. 10 shows an arrangement based on FIG. 2 but expanded to include additional manipulation capabilities. Only one of the input and output ports together with associated components is shown for simplicity as is only a single frame store associated with the common highways 56 and 57.

Composite analogue video information is received at the first input port and is passed to analogue to digital converter 201. The incoming video is also received by sync separator 60 which passes the sync information for use by the store address and control block for and by elements 61-68 of FIG. 2 which provides store addressing as described above for each of the frame stores (only frame store 38 is shown). The addressing can be controlled when desired both by the image plane mapping selected for a given time slot and the joystick control 184 in the manner already described.

The timing highway available from control 61-68 to computer interface 56, high speed processor 232 and digital to analogue converter 221 synchronises the system operation. The digital video from converter 201 instead of passing direct to input multiplexing buffer 30 passes via recursive processor 209 constituted by look up table 210, arithmetic and logic unit 211 and look up table 212. However, when desired, by suitable setting of the LUT and the ALU the path will be transparent to the data to correspond to the FIG. 2 situation. Data from multiplexer 30 passes to the common input highway 56. Data read out from the frame stores passes from the common highway 57 to output multiplexer (buffer) 48 and thence via LUT 220 to the digital to analogue converter (DAC) 221. Syncs etc will be added after conversion as necessary to provide composite video.

In practice ADC 201, processor 209, LUT 220 and converter 221 would typically be repeated six times to provide the 6 input and output ports. Each of the six ADC's 201 can provide data onto any of the six early buses 238.

The computer has access to enter and retrieve video data as before under the control of the multiplexer 36, 54 providing input and output buffering respectively. A number of LUT map blocks 225-230 are provided as is control bit dropper 231 for reasons described below. A high speed processor 232 is also shown. The system includes several buses viz late bus 337, early bus 238, control bus 236 and M-bus 235 which can be bi-directional in nature to allow interaction between the various system blocks to which they are linked.

M-BUS

This bidirectional bus is used to allow data to pass to and from the various blocks at computer rate (e.g. 50 KHz per picture point) or high speed processor rate (e.g. 1 MHz per p.p.). Thus data manipulated by the computer 59 can pass to and from this bus via interface 56. Non video data from the computer can also use this bus, for example to select a given image plane or store address by feeding the instructions to control 61–68, and for controlling the LUTs. Thus this manipulation bus (M-bus) allows additional system flexibility.

CONTROL BUS

This bus is provided to allow data stored within the frame stores to be used as control data to influence system operation. This is achieved by passing data to control bit dropper 231 to generate the necessary instructions for the LUT map blocks 225–230.

EARLY AND LATE BUSES

Although the system incorporates multiple input and output video highways 56 and 57 which allows interaction between channels when the data is in digital form, by adding two other video buses 237, 238 as shown still greater manipulating power is achieved. These buses have a fixed time relationship respectively to the store input and output timings and can be used for recursive video functions. These buses are bi-directional allowing both feedback and feedforward operation.

Figure 11:
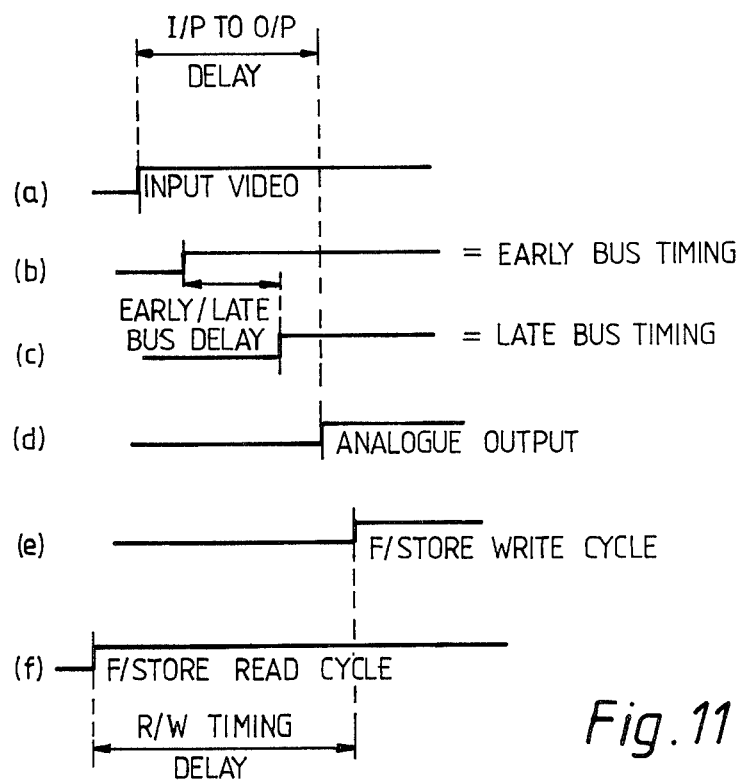
FIG. 11 shows the system timing interrelationships.

As already mentioned there is a fixed delay between the commencement of a store read cycle and the commencement of a frame store write cycle determined by the delay block 62 of FIG. 2. This situation is illustrated in the timing diagram of FIG. 11 where the start of a read cycle is represented by wave form (f) and the write cycle by waveform (e). This fixed delay may be the equivalent of 15 picture point clocks for example. The start of the incoming video is represented by waveform (a) and this will be delayed by its passage through ADC 201 as represented by waveform (b) This waveform also represents the timing on the early bus so that both incoming and previously stored data can have the same timing relationship. The late bus timing is represented by waveform (c) and the processor 209 and LUT 220 each will be provided with an inherent delay equivalent to the difference between the early and late bus timing so as to allow data passage without inteference or degradation. The delay produced by the passage of data through DAC 221 is represented by waveform (d).

The provision of the early bus allows data to be passed back and handled by the processor 209 as though it was incoming data from an input port. The processor is shown as a recursive processor, but could comprise other types of hardware providing fixed function video rate processing (e.g. 10 MHz per picture point).

An example of recursive operation is now described with respect to spatial filtering.

(a) Spatial Filtering

Figures 12, 13:
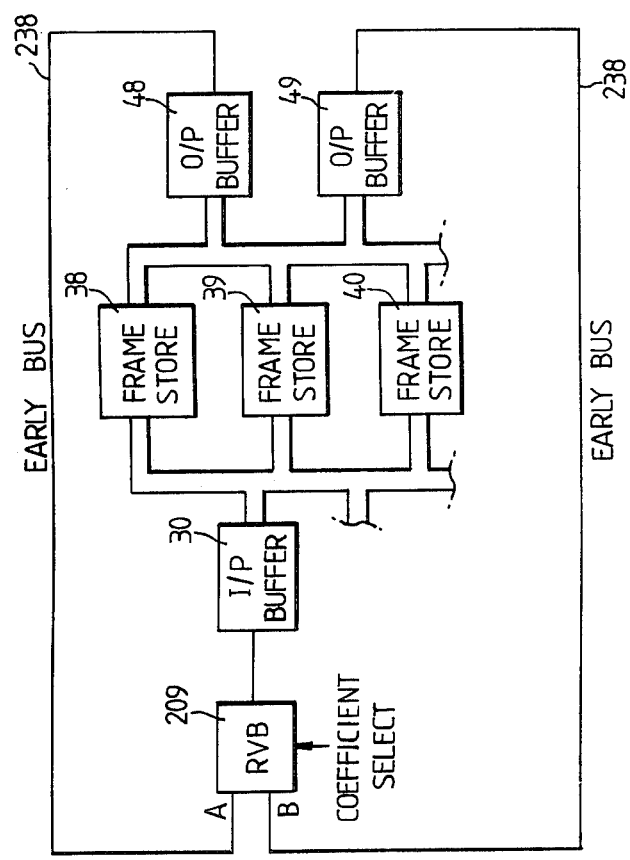
FIG. 12 shows an example of a Kernal matrix used for image enhancement.
FIG. 13 shows in detail the operation of those elements of FIG. 10 associated with this spatial filtering enhancement.

The requirement of spatial filtering is to use data from adjacent picture points to compute the picture point of interest so as to result in an enhanced picture. Such filtering can be effected on part or all of the frame. In the FIG. 12 example the spatial filtering is shown as being selected to comprise a matrix of 9 picture points $P_1$ through $P_9$. To enhance point $P_5$, it will require data from the 8 surrounding picture points within the Kernel matrix. Because the system has access to several frame stores simultaneously with independent addresses it is possible to use recursive processor 209 of FIG. 10 to evaluate the matrix multiplication very rapidly as shown by FIG. 13 which constitutes the relevant circuit portions transposed from FIG. 10. Thus by scrolling the frame by 1 picture point relative to another it is possible to read out data from the relevant frame store, pass it via the early bus to the processore 209 so that it receives picture point N to effect the desired manipulation where it is multiplied by coefficient $K_N$ selected via the M-Bus from the computer. The result passes via buffer 37 to the stores for storage in an available location and for subsequent read out during later steps. So the steps continue until the entire frame (if required) is enhanced.

For the particular matrix shown the computation would proceed as 9 steps as follows where

| Step No. | |
|---|---|
| 1 | $B_1 = K_1 \times A_{(x-1,y-1)}$ |
| 2 | $B_2 = B_1 + K_2 \times A_{(x,y-1)}$ |
| 3 | $B_3 = B_2 + K_3 \times A_{(x+1,y-1)}$ |
| 4 | $B_4 = B_3 + K_4 \times A_{(x-1,y)}$ |
| 5 | $B_5 = B_4 + K_5 \times A_{(x,y)}$ |
| 6 | $B_6 = B_5 + K_6 \times A_{(x+1,y)}$ |
| 7 | $B_7 = B_6 + K_7 \times A_{(x-y,y+1)}$ |
| 8 | $B_8 = B_7 + K_8 \times A_{(x,y+1)}$ |
| 9 | $B_9 = B_8 + K_9 + A_{(x+1,y+1)}$ = result |

A = original picture data
B = computed data at each step

Thus the first step in processor 209 uses only data at input A but the subsequent steps use data from previous calculations used as input B for summation therein with the other data. Central picture point $P_5$ in the matrix is designated as being at location x,y.

The computation of an entire frame will take 9 frame time periods (0.36 sec). Similarly a $5 \times 5$ selected matrix will take 1 second and a $9 \times 9$ matrix will require 3.24 secs. This is a considerable improvement on known computer controlled systems which can take several minutes to compute such enhancement.

By inclusion of late and early bus structure, any desired processing function can be placed between the two as illustrated by the recursive processor 209.

Figure 14:
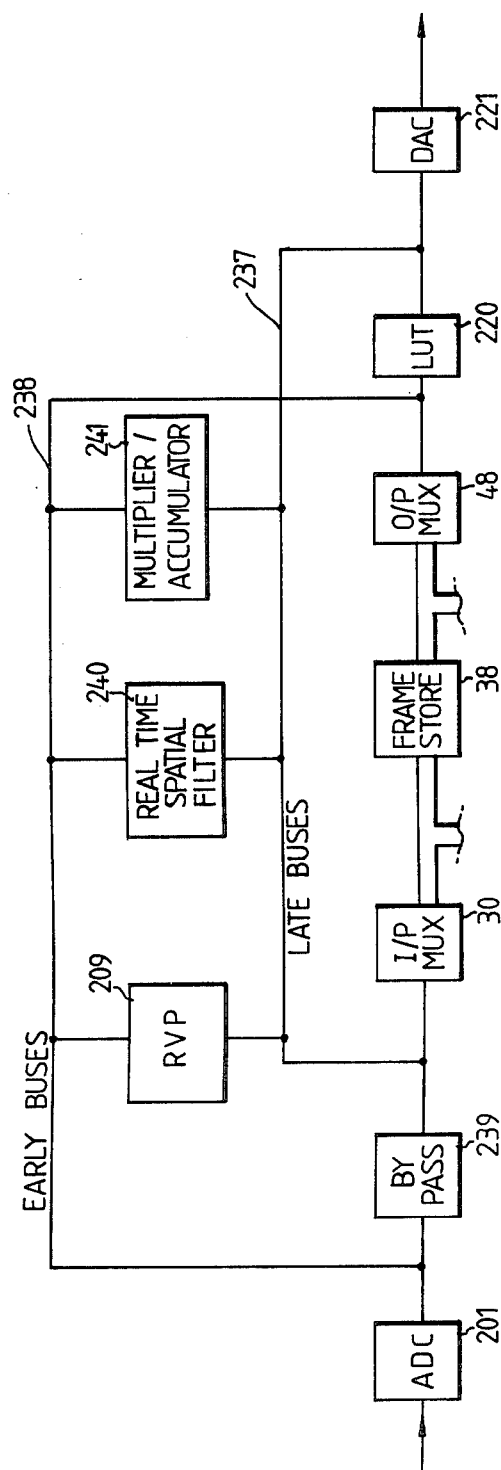
FIG. 14 shows additional processing units between the early and late buses.

In practice the processor 209 can be placed anywhere between the early and late buses as now shown in FIG. 14. A bypass block 239 is then needed to cope with the fixed delay period between the early and late timing. The bypass can simply use RAM techniques for delaying the data by a fixed period equivalent to the picture point clocks between the two bus timings. RAM delay techniques are already described with relation to FIG. 8. Other hardware processors can also be coupled between the buses as illustrated by the real time spatial filter 240 and the multiplier/accummulator 241. A given processor will have an inherent delay dependent on how it manipulates the data received. If the inherent delay is less than the delay relative to the buses, additional delay using a RAM can be provided for that processor so that it is compatible with the system. This also applies to LUT 220.

It can thus be seen that it is expedient to have a fixed time delay between store read and write cycles of sufficient magnitude to allow the early and late bus timing to accommodate any desired processor whilst maintaining rapid operation.

(b) Feedforward to Display

By using the early bus as a feedforward device it is possible (see FIG. 14) to take the incoming data and make it available directly for display without intermediate frame storage. The LUT 220 if required can effect output processing on the data prior to receipt by the DAC and such processing could include gamma correction, transformation, graphical overlay and windows. If the processed data is required for retention it can be passed via the late bus back to the frame stores after receipt by the input multiplexer 30 for example.

The late bus allows the results from the recursive processor 209 to be fed forward to monitor the results. The processor 209 is capable of effecting other calculations such as subtraction to operate as a movement detector for example and the result displayed via the late bus. Any data required for storage can be retained by means of the late bus operating in reverse to pass data back to input multiplexer 30.

(c) Self-Test

The buses can also be used to provide a self test capability. A selected programme will generate data for storage in one frame store and commands the output processor 220 and allows the resultant data to be fed back via the late bus to another frame store. The actual result is compared with the expected result to see if any errors have arisen. In a similar manner the early bus can be used to simulate the ADC output to check the integrity of the input processor 209 and associated elements for the input side of the system.

INSTRUCTION DATA USING THE CONTROL BUS

The system as described in FIG. 10 has the capability of using the integral frame storage to accommodate system instructions as though it were normal data. The instruction data may switch the entire system into different states on a pixel by pixel basis using the control bus. The data from the output buffer 48 is available to the control bus via bit dropper 231. The bit dropper selects which bits from a particular buffer is made available to this bus.

The instruction data is used to select a particular map function from map LUT 225-230 dependent on the data content on the control bus.

Figure 15:
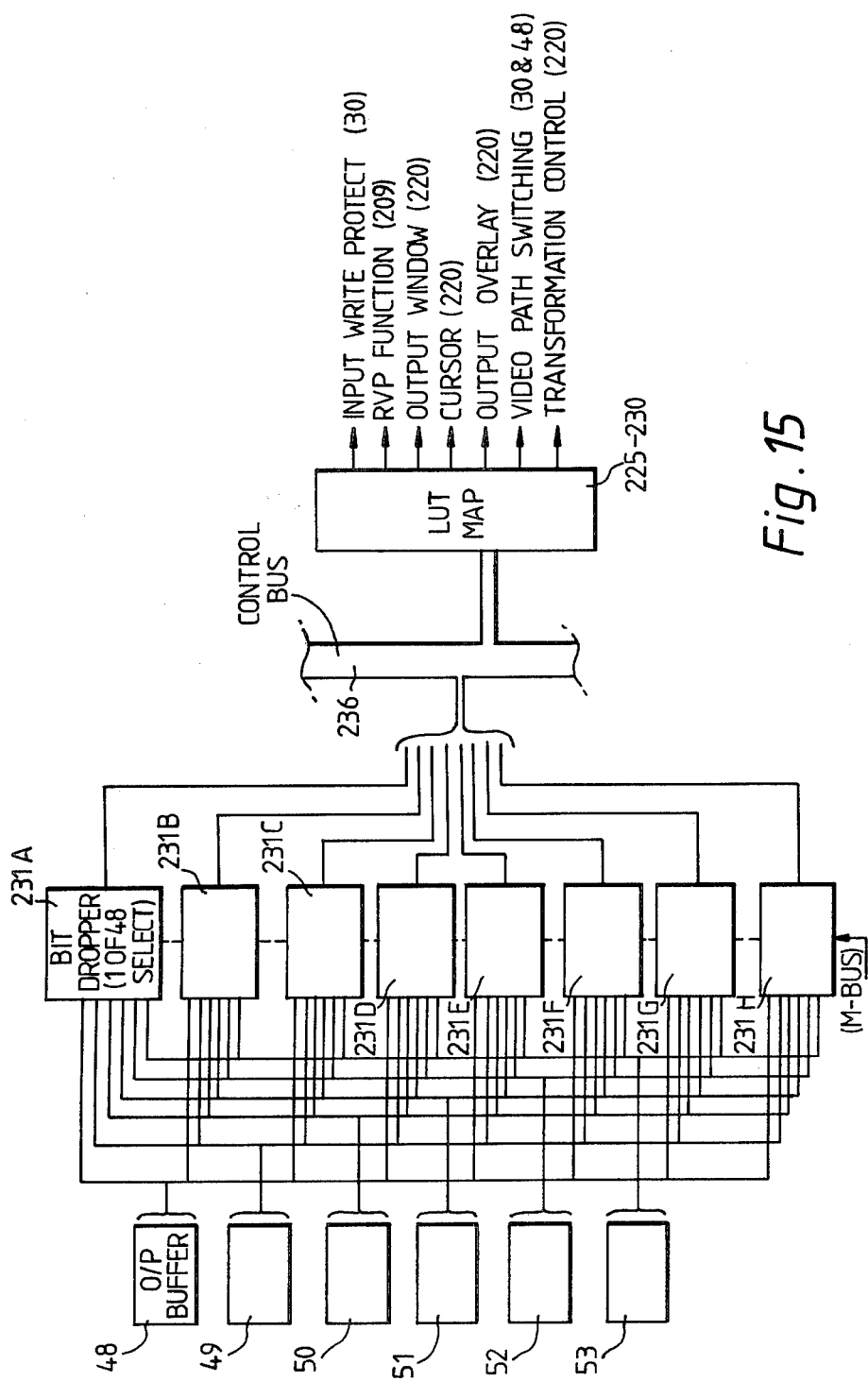
FIG. 15 shows the operation of the bit droppers of FIG. 8 via the control bus.

In practice as 8 bits are required for the control bus then 8 droppers will also be used as now shown in FIG. 15. The 8 bit data from each of the output buffers 48-53 is received by each bit dropper 231A-231H. With 6 output buffers the total bits available at each dropper is 48. The bits selected are under the control of the computer via the M-Bus 235. The single bit from each dropper provides an 8 bit output for passing to the video rate control bus 236 where it is received by map block 225-230 which provides the selected function in dependence on the bus data. Examples of the control functions are input write protect (via map block 227), recursive video processing (via map block 226), output window, cursor or overlay (via map block 230) or video path switching (via map blocks 227 and 229) or transformation control (via LUT block 220). A given function can change on a picture point by picture point basis if required.

AREA SWITCHING FOR OUTPUT TRANSFORMATION

Figure 16:
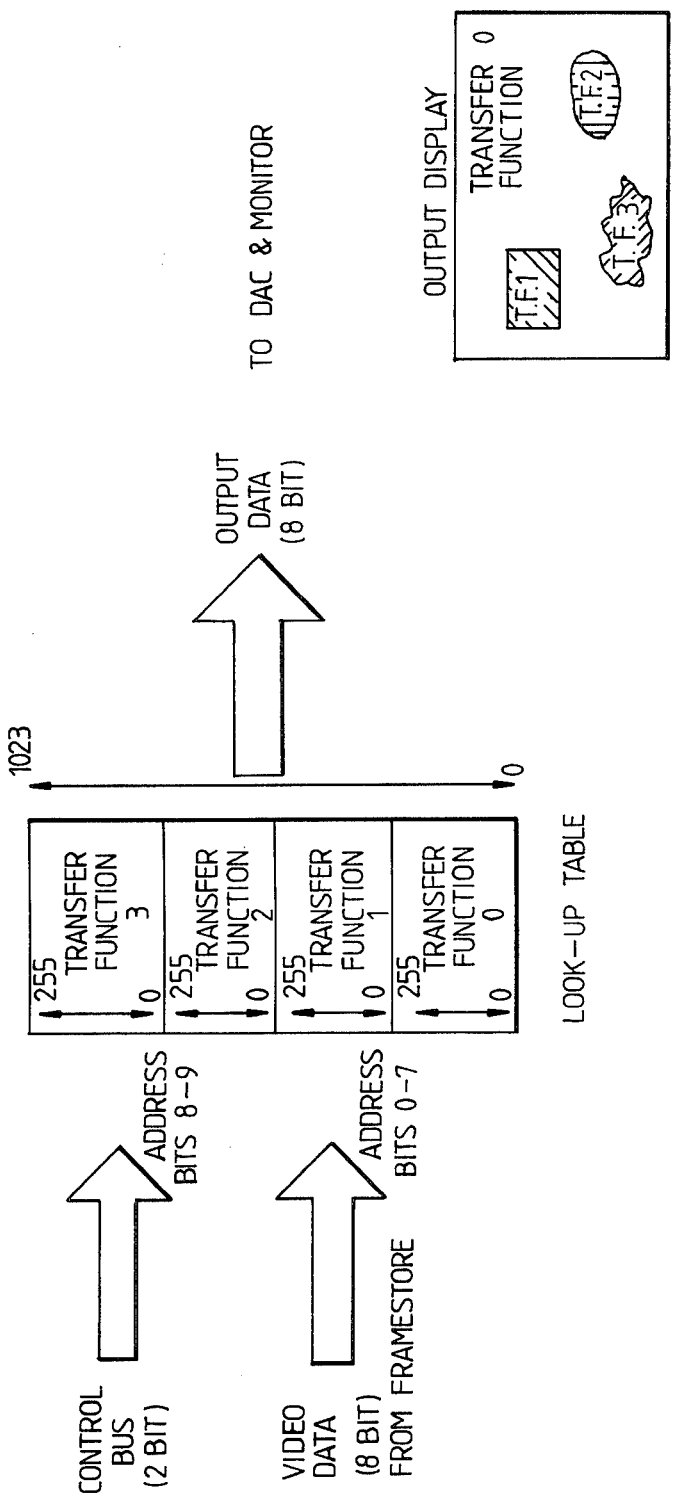
FIG. 16 shows the configuration of the output LUTs to achieve multiple output transfer functions.

As already mentioned one of the frame stores could be used to define particular areas on the image as displayed on the monitor and this data can be used as controlling information rather than normal video data. This stored data itself will be used to control the look up tables so that different functions will be achieved by the look up tables dependant on the particular area being shown (see FIG. 16). In practice up to 16 different transfer functions could be selected by using $4096 \times 8$ LUTs and 4 control bus bits.

GRAPHICS STORE

By expanding the look up table 220 at the output as described above and loading constants into all the transfer functions except 0 then any combination of desired graphics overlay can be accommodated. The output will be switched to a particular colour as defined by the LUT whenever the graphics overlay is required. Since the control bus may receive data from any video store then the video store effectively becomes a graphic store using the control bus. Thus there is no longer any need for a dedicated graphic store.

HIGH SPEED PROCESSOR

The high speed processor 232 of FIG. 10 is included to allow real or near real time processing. Such a processor may comprise a programmable bit slice microprocessor. Unlike previously disclosed processors in the video art this processor is programmable and can be used to manipulate (image process) the data in the stores and also control the system in a similar manner to the host computer 59 but much faster (typically 1 MHz per picture point). It can be programmed by means of the host computer 59. This high speed processor can be used for rapidly effecting fast Fourier Transforms, image rotation or intensity histograms for example.

It can be seen that the system described allows great flexibility and power of processing. Because of the time slot allocation, the system is not restricted to a single in/out port with access by the computer only during the blanking interval. As the time slots are of short duration this allows rapid sequencing and the system can thus handle real time data from a number of ports and effectively continual access by the computer if desired. Thus to an operator it will seem that he has continuous access to the system even though in practice this access is sequential rapid access as far as the highways are concerned.

I claim:
1. A video image processing system comprising:
   a plurality of data input ports and at least one data output port;
   a plurality of frame stores each capable of storing data equivalent to a frame of video information;
   a common input highway for the frame stores and adapted to receive data for storage in the frame stores;
   a common output highway for the frame stores and adapted to provide data from the frame stores to the at least one output port;
   processing means adapted to have access to at least one of the common input and output highways respectively to effect processing of the data available therefrom;

control means for controlling the passage of the data to and from the common highways to allow the processing means, the data input ports, and the at least one data output port to independently gain access to the frame stores for given time slots on a time multiplex basis; and data buffer means for assembling received data into blocks and connected to receive data from respective data input ports and from said processing means, and to pass received data in blocks to the input highway during respective time slots.

2. A system according to claim 1, wherein the control means is adapted to allow independent access to the highways for a time slot of at least one picture point duration in the input data, but of substantially less than one frame duration in said input data.

3. A system according to claim 1, including multiple data output ports and wherein said control means is adapted to allow the output ports, as well as the output and the input of the processing means and the input ports, independent access to the input and output data highways for given time slots on a time multiplex basis.

4. A system according to claim 3, wherein the input ports each include a data buffer for receiving and holding input data prior to each respective time slot and for passing said input data in a block to the common input highway during said time slot and the output ports each include a data buffer for receiving output date from the common output highway during a respective time slot, and for outputting said output data after said time slot.

5. A system according to claim 4, wherein each input data buffer is adapted to assemble incoming data into data blocks equivalent to the number of picture points between successive time slots during which the data is passed from said buffer to the input highway.

6. A system according to claim 1, including accessing means for allowing data to or from the frame stores to be handled so as to define at least one image plane comprised of a plurality of picture points in excess of that available from a single video frame.

7. A system according to claim 6, wherein the accessing means includes a memory for holding positional information relating to an image plane so as to identify the one or more frame stores required to be accessed and their relative frame positions for a chosen image plane and for determining the locations of desired picture points within a given frame on a picture point by picture point basis.

8. A system according to claim 7, wherein the accessing means includes an offset generator for producing an offset to modify the area selected from within the image plane.

9. A system according to claim 8, wherein the offset generator is controlled by manually operable means.

10. A system according to claim 8, wherein adjustable delay means are provided to delay the passage of data for a period dependent on the offset generated.

11. A system according to claim 8, wherein a blanking device is provided to prevent degradation of the video data whenever the offset causes the accessed image to move outside the selected image plane.

12. A system according to claim 7, including compression means adapted to receive data available from the common output highway during first multiplexed periods for allowing a reduced size image representative of a selected first image plane to be reproduced into a second image plane for subsequent display during second time multiplexed periods.

13. A system according to claim 12, wherein the accessing means is adapted to route data corresponding to an accessed area within the selected image plane for display separately but concurrently with the reduced size image of the entire images plane and for incorporating a border within the compressed image corresponding to the accessed area.

14. A system according to claim 1, wherein the control means includes a fixed delay device to provide a fixed delay between the commencement of the store reading and writing operations whereby the system operates synchronously but with a fixed time differential.

15. A system according to claim 14, wherein the delay device is adapted to provide a delay equivalent to a fixed number of picture point clock periods.

16. A system according to claim 14, wherein a first and second bidirectional bus is provided having a fixed time relationship relative to the store system write cycles and read cycles respectively to allow additional access to the data for further manipulation, for feeding backwards for additional storage or for feeding forwards without intermediate frame storage.

17. A system according to claim 16, wherein the number of first and second bi-directional buses provided corresponds to the number of input or output ports.

18. A system according to claim 16, including at least one picture point processor connected between the first and second buses so as to gain access to both incoming data and previously stored data to produce a compatibly timed output dependent on data received from at least one of the buses.

19. A system according to claim 18, wherein the processor is adapted to have access to the system output via the buses to allow the processed output to be passed to the system output without intermediate frame storage.

20. A system according to claim 18, wherein the at least one processor is adapted to provide recursive processing of previously stored data with incoming data having the same timing relationship to effect temporal filtering.

21. A system according to claim 18, wherein the at least one processor is adapted to manipulate data from adjacent picture points within a field to effect spatial filtering.

22. A system according to claim 18, wherein the at least one processor is adapted to operate as a multiplier.

23. A system according to claim 18, wherein the at least one processor comprises a look up table for effecting a transfer function dependent on the data received at its input.

24. A system according to claim 23, wherein the look up table is adapted to allow any frame store to operate as a graphics store.

25. A system according to claim 16, wherein a bypass device is provided between the first and second buses to allow retimed data to pass therebetween.

26. A system according to claim 1, including a control bus for receiving control data and control selector means for receiving video or instructional data previously stored in the frame stores to provide data so as to effect control of the system processing via the control bus in dependence on the data received.

27. A system according to claim 26, wherein the control selector means include a plurality of bit selectors and a look up table for selecting a specified function.

28. A system according to claim 1, including a high speed processor and wherein a manipulating data bus is provided to allow the processing means and the high speed processor to independently gain access to data over a time multiplex basis.

29. A system according to claim 28, wherein the high speed processor comprises a programmable bit slice microprocessor.

30. A video image processing system comprising:
a plurality of frame stores each capable of storing data equivalent to a frame of video information;
means for applying video data to said frame stores so that data information relating to different image frames are stored in different ones of said frame stores;
means for selectively reading data from said frame stores to derive signals from a group of said frame stores, which derived signals constitute a desired output frame of video information;
said means for selectively reading including presettable means for selecting data from storage positions in said group of frame stores determined by the setting of said presettable means and so related that said desired output frame is built up of video information relating to adjacent areas of the different frames stored in said group of frame stores.

31. A video image processing system according to claim 30, further comprising:
means for setting up signals defining at least one image plane comprising at least said group of frame stores;
said presettable means comprising means for providing offset signals determining a point in said image plane which locates said desired output frame with respect to said image plane; and
said means for selectively reading being responsive to said offset signals.

32. A video image processing system according to claim 31, further comprising:
a video information compressor;
means for reading data from said group of frame stores to said compressor;
said compressor operating to reduce said last-mentioned data to data capable of being stored in a single frame store; and
means for displaying said compressed data in a single frame of video information.

33. A video image processing system comprising:
a plurality of frame stores each capable of storing data equivalent to a frame of video information;
a video processor, for processing data so as to modify said video information;
means for applying processed data from said video processor to a selected one of said frame stores;
means for applying input data to said video processor;
means for selectively reading data from said frame stores to derive data representing output video information;
a data path; and
means for connecting said data path from the output of another selected one of said frame stores to the input of the video processor, to include said video processor in a recursive video processing loop.

34. A video image processing system according to claim 33 further comprising:
means for deriving control data from and relating to video information stored in particular frame stores; and
means for utilizing such control data to influence the operation of the video processor respective to a particular frame store.

35. A video image processing system according to claim 33, further comprising:
look-up tables for modifying data output from said frame stores so as to modify the respective video information;
a further data path from the output side of each look-up table; and
means for selectively connecting each said further data path to the output of said video processor.

36. A video image processing system according to claim 35 further comprising:
means for deriving control data from and relating to video information stored in particular frame stores; and
means for utilizing said control data to influence the output of a respective look-up table.

* * * * *